United States Patent [19]
Drews

[11] Patent Number: 5,316,708
[45] Date of Patent: May 31, 1994

[54] METHOD FOR MAKING PRODUCTS MADE FROM RECYCLED VEHICLE TIRES

[76] Inventor: Terence Drews, 130 Teton La. #8, Mankato, Minn. 56001

[21] Appl. No.: 821,937

[22] Filed: Jan. 15, 1992

Related U.S. Application Data

[63] Continuation-in-part of Ser. No. 583,327, Sep. 17, 1990.

[51] Int. Cl.⁵ .............................................. B29C 43/02
[52] U.S. Cl. .................................. 264/40.5; 264/109; 264/120; 264/DIG. 69; 428/903.3
[58] Field of Search ............ 428/903.3; 264/DIG. 69, 264/109, 122, 120, 40.5

[56] References Cited

U.S. PATENT DOCUMENTS

| | | |
|---|---|---|
| 2,977,864 | 4/1961 | Pullar . |
| 3,027,599 | 4/1962 | Pluhacek et al. .......................... 18/55 |
| 3,801,421 | 4/1974 | Allen et al. . |
| 4,003,408 | 1/1977 | Turner ..................... 264/DIG. 69 |
| 4,028,288 | 6/1977 | Turner ................................. 260/2.3 |
| 4,110,420 | 8/1978 | Turner ................................... 264/41 |
| 4,125,578 | 11/1978 | Sear ...................................... 264/29.5 |
| 4,183,505 | 1/1980 | Maestri ................................ 256/13.1 |
| 4,186,913 | 2/1980 | Bruner et al. ...................... 256/13.1 |
| 4,320,082 | 3/1982 | Houle .................................. 264/257 |
| 4,378,067 | 3/1983 | Butler et al. . |
| 4,594,021 | 6/1986 | Schäfer et al. .......................... 404/14 |
| 4,795,603 | 1/1989 | Nagayasu .................... 264/DIG. 69 |
| 5,094,905 | 3/1992 | Murray . |

FOREIGN PATENT DOCUMENTS

| | | |
|---|---|---|
| 2339649 | 2/1975 | Fed. Rep. of Germany . |
| 2404533 | 8/1975 | Fed. Rep. of Germany . |
| 2752831 | 5/1979 | Fed. Rep. of Germany . |

*Primary Examiner*—Mary Lynn Theisen
*Attorney, Agent, or Firm*—Evenson, McKeown, Edwards & Lenahan

[57] ABSTRACT

Process of making building block members by mixing natural latex with shredded vehicle tires to form a mixture, placing the mixture in a mold, applying pressure to compress the mixture, and maintaining pressure for a time period during which the latex hardens and cures.

17 Claims, 6 Drawing Sheets

METHOD FOR MAKING PRODUCTS MADE FROM RECYCLED VEHICLE TIRES

This application is a continuation-in-part application of my pending application Ser. No. 07/583,327, filed Sep. 17, 1990. The disclosure of this co-pending application is incorporated herein by reference thereto.

BACKGROUND AND SUMMARY OF THE INVENTION

In the above-mentioned co-pending application, a method of manufacturing barriers, and barriers themselves, were described, which utilized cut-up pieces of recycled vehicle tires to form building block members. In this earlier application, the cut-up tire material was placed in a cage which was then placed in a mold box with clearance around the outside edges of the cage for the admission of liquid latex material. The liquid latex material was supplied to the gap surrounding the cage and was allowed to harden to form a barrier which could be then used for a road barrier or the like. The barrier of this earlier application included latex material only in the outer layers around the block of material that was formed, with the interior consisting essentially of only the cut-up vehicle tire parts. This arrangement of my prior application was very well suited for certain applications, especially for the making of large barrier pieces of the type described in that application, weighing up to 1800 pounds or so.

In commercial operations for recycling vehicle tires, there is normally used a multi-stage process, including a first stage where the tires are cut into pieces about one inch by six inches in size, followed by a second shredding or cutting stage wherein the tire parts are cut into pieces with a maximum size of three inches, followed by a third stage with a maximum size of one inch, a fourth stage with a maximum size of one-half inch by one-half inch, a fifth stage with a size of about one-quarter inch maximum size, and two or three further stages that eventually reduce the tires to very small powder like particles. Depending upon the nature of the use of this recycled tire product, the shredding to the various smaller and smaller dimensions is required. For example, in most processes for making products from recycled tires, the shredding to a sixth to eighth stage with particles smaller than a quarter inch maximum are required. According to one aspect of the present invention, it is provided to utilize recycled tire pieces which have only been shredded to the third or fourth stage to a maximum size of about one-half inch. Thus, the recycling process for providing these maximally sized one-half by one-half inch tire pieces is substantially more economical than would be case if further shredding stages were required.

An object of the present invention is to improve on the arrangement of my earlier application by providing a more commercially viable way of using recycled vehicle tires to make building block members. Another object of the present invention is to provide improved apparatus and methods of manufacture which facilitate a precise control of the density of the building blocks to be formed. Another object of the present invention is to provide improved apparatus and methods which facilitate high quantity mass production with reliable repeatability of building member products being made.

Another object is to provide apparatus and method of manufacture which accommodate use of vehicle tire pieces that are first cut into pieces that are of a size of one-half inch by one-half inch or smaller, thereby obviating the need for yet further shredding or cutting steps on the tire parts.

Another object of the invention is to provide improved building block member products from recycled vehicle tires.

It is contemplated that the improved building block member products can be used for land erosion control, bank stabilization control, temporary flood control, construction of temporary dams for work under otherwise relatively shallow water, such as boat ramp constructions and the like, as road barriers, as temporary protective shields for detonation of explosions, as firing range backstops, and the like. The improved building block member products of the invention are especially suited for in ground and underwater usage as the completed and sealed block members, described herein, do not permit "leaching" of the material making up the vehicle tire parts included in the block members. It is another object to have a process and resultant block member products which can be made sufficiently dense to sink in water to thereby facilitate underwater anchoring thereof.

The objects of the present invention are obtained according to preferred embodiments of the invention by providing that the recycled tire pieces are first mixed with liquid latex material to form an uncured mixture with the liquid latex material substantially coating all of the tire parts, subsequently pouring the uncured mixture into a mold form to a predetermined level and then applying a pressure to the uncured mixture in the mold form to compress the mixture to a predetermined compressed building block member size where it is cured under pressure. With this arrangement, advantage is, taken of the fact that the unpressurized uncured mixture can be easily mixed, and then the pressurizing of this uncured mixture in a mold provides for a rather rapid curing of the mixture to form the composite solid building block member. Subsequently to a predetermined amount of curing so that the building block member is solidly self-sustaining, it is removed from the mold and, in preferred embodiments, is coated with a latex rubber sealer on the outside which dries very fast and forms a finished surface over the building member. Building block members produced according to this process are relatively homogenous throughout their cross-section and their density can be controlled by the compression step so as to provide different density building block members for different purposes. For example, building block members to be used for dike control purposes can be compressed to a higher specific density than building members to be used as highway crash barrier members.

According to certain preferred embodiments of the present invention, a multi-step compression of the uncured mixture takes place at the mold form so as to facilitate manufacture of relatively large building members with substantially uniform density. According to this preferred method of the invention, the uncured mixture of liquid latex material and tire parts is placed into a mold form to a predetermined level, a first predetermined pressure is then applied to this uncured mixture in the form to compress the same to a first precompressed level, subsequently the form is again filled to the predetermined level with further uncured mixture on top of the precompressed level layer, and a second pressure is applied to the newly added uncured mixture to compress the entire mixture in the mold to a desired final configuration. This second compression is done at a substantially higher pressure than the first precompression so that the first precompressed level layer is further compressed to the final desired density of the building member being made. This multi-stage compression of the mixture to form the completed building block facilitates a reliable, repeatable manufacturing process. It also facilitates adjustment of the compression level of the material to thereby form different density building blocks for different purposes.

In especially preferred embodiments, the building blocks formed according to the invention are of a regular polygon shape and include protrusions and recesses which are positioned to mate with corresponding recesses and protrusions in similar building blocks to form multiblock constructions. These recesses and protrusions at the exterior sides of the building block are formed at respective opposite sides of the building block by the simple means of configuring the mold box or form. Further through apertures for anchor bolts, etc. are provided in the building blocks by the simple expedient of utilizing a rod in the mold form for defining the through apertures. In especially preferred embodiments, the through apertures are located centrally of the mating recesses and protrusions on the building block.

According to certain preferred embodiments of the invention, the mixing of the liquid latex material and the shredded vehicle tire parts is accomplished by a conventional small-batch cement mixer, for example, a portable cement mixer of the type that typically mixes one-third yard batches of cement. In a preferred practical embodiment of the invention, 111 pounds of recycled tire pieces, cut to sizes of approximately one-half inch by one-half inch or smaller, are mixed with five quarts of latex material which weighs approximately eight and a quarter pounds per gallon. This mixture provides for a substantially complete uniform coating of the shredded tire parts so that when the uncured mixture is later subjected to the precompression and ultimate final compression to form the final building block configuration, a homogenous strong block of material results. Since the uncured mixture of the liquid latex material and shredded vehicle tire parts does not set up or cure very quickly to a solid when it is not under pressure, as is the case when it is being mixed in a drum-type cement mixer of the type mentioned, there is sufficient time to facilitate the mixing of a batch and of the two-step supply, precompression and further supply and final compression in the mold form. This single batch of 111 pounds of shredded tire parts and five quarts of latex results in a finished rectangular block which is two feet long, one foot high and one foot wide and weighs about 120 pounds.

In other preferred embodiments of the invention, the mixing of the liquid latex material and the shredded vehicle tire parts is accomplished by using rotating helical auger which simultaneously mixes and conveys the tire parts and liquid latex material sprayed thereon as it is being conveyed, and supplies the same to the mold form. This auger arrangement has the advantage of providing for essentially continuous supply and mixing of the uncured mixture, for sequential supply to multiple molding forms to facilitate mass production of building members.

In especially preferred embodiments, a hydraulic cylinder and ram attachment to one side of the mold serving as a presser plate is provided for applying the compression forces to the uncured mixture in the mold form. Thus, in a simple manner, the cover or presser plate of the mold form can be forced down by hydraulic pressure on the presupply of uncured mixture at the bottom of the mold form. The cover presser plate is then lifted by the hydraulic ram, the mold form is again filled to a predetermined level, and then the final compression forces are applied by the hydraulic ram and cover press plate.

According to especially preferred embodiments, the system for supplying the uncured material to the form, the hydraulic ram system for compressing the uncured mixture in the form, and the removal of the partially cured compressed building block members from the form are controlled and timed by a computer control system so as to assure consistent repeatability of building block member products to be formed. When it is desired to change the specific density of the building members to be formed, appropriate adjustments are made to the computer control system that controls the pressurizing forces on the hydraulic ram. Furthermore, the system can be calibrated in a simple manner according to the invention by initiating test runs with test building block member products being made, and then recording the positions of the hydraulic ram and the positions of the layers of uncured material before and after compression stages, which information can be stored and repeated once the desired characteristics of a building block member product are obtained. In this manner, an approximation of the density of the building member product can be precalculated, which will give a good approximation of the level of uncured material to be supplied at each of the compression stages in the mold form, as well as the pressure forces and movement of the hydraulic ram desired to reach the desired building member block side, to form initial test block members. Once optimum building block members have been achieved by checking and adjusting to calibrate the system, the control system can use these calibrated/determined values to control continuous future operations.

Such a control system is also very adaptable to changing block densities and to accommodate to different characteristics of the batch of uncured mixture which could vary a small amount depending upon the nature of the tires that have been utilized for the tire pieces that are being mixed therewith.

Other objects, advantages and novel features of the present invention will become apparent from the following detailed description of the invention when considered in conjunction with the accompanying drawings.

DETAILED DESCRIPTION OF THE DRAWINGS

Figure 1:
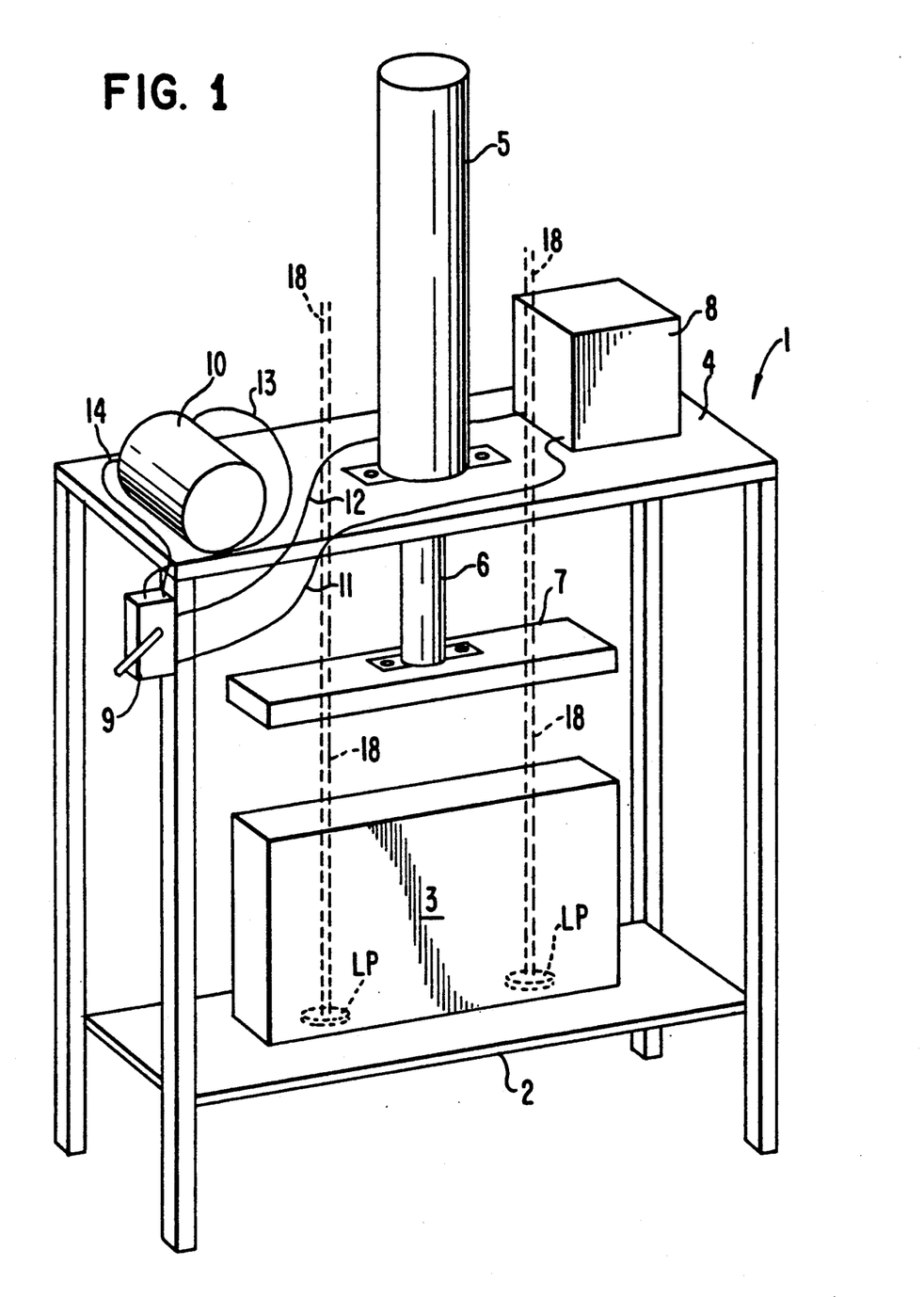
FIG. 1 is a schematic representation of an arrangement for making building member products from a mixture of recycled tire parts and latex.

FIG. 1 schematically depicts apparatus for making building block members from shredded vehicle tire parts. This assembly includes a support frame table 1 which has a lower support floor 2 which supports a mold form box 3. The upper support plate 4 of the table 1 supports an hydraulic piston cylinder arrangement 5 which is attached to a movable ram 6 to selectively raise and lower the ram 6. The ram 6 is in turn fixedly attached to a mold cover presser plate 7 which forms the top side of the mold 3 during use, as will be explained in more detail below.

In FIG. 1, there is only very schematically shown in dashed line the guide rods 18 which have lifting plates LP at their bottom and which are disposed for slidable movement with respect to the presser plate 7, as well as with respect to the tabletop 4. These guide rods 18 serve to perform a mold to form through apertures in the blocks to be made, as described below, and also to facilitate the lifting of a completed block member B out of the mold. Details of the inter-relationship of the rods 18 and the presser plate 7 are included in conjunction with the description of the operation of the system with respect to FIGS. 2 through 6.

The hydraulic cylinder unit 5 is supplied with hydraulic oil from hydraulic oil storage tank 8, controlled by control valve lever unit 9 and pump and motor unit 10. Hydraulic pressure lines 11, 12, 13 and 14 are provided for the communication of the hydraulic fluid in an otherwise conventional manner between the oil tank 8 and the actuating chambers of the piston-cylinder unit 5.

Figure 2:
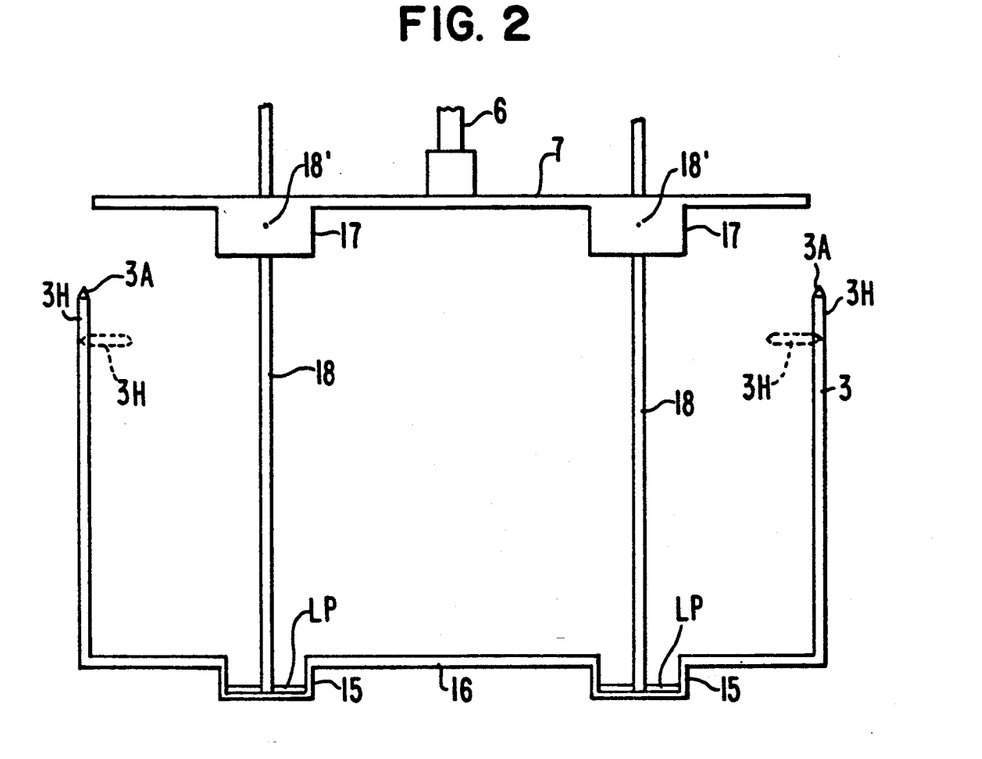
FIG. 2 is a schematic sectional view of the mold form and press plate of FIG. 1.

FIG. 2 is a schematic sectional view of the mold box 3, the top cover presser plate 7 and the ram 6. The mold block 3 has a generally rectangular configuration, with the exception of the cylindrical protrusions 15 which are located symmetrically at the center of the bottom 16. The top cover presser plate 7 is provided with cylindrical protrusions 17 which are located symmetrically in the top cover presser plate 7 so as to be directly opposite the corresponding recesses 15 in the bottom 16. Protruding upwardly from the center of the recesses 15 and through the corresponding protrusion 17 are rods 18 which are disposed so as to permit relative sliding movement thereon by the cover presser plate 7 during compressing operations as discussed below. As can be seen from FIGS. 7, 8, and 9, the recesses 15, rods 18, and protrusions 17 of the mold box dictate the shape of the finished building member block. At the bottom of rods 18, there are lifting plates LP which are detachably attached by a threadable connection and serve to facilitate lifting up completed blocks B. Two oppositely facing side walls at the box 3 include hinged sections 3H at the top which can be pivoted to a horizontal position to support a block B after it is lifted from the box 3.

The manufacture of the building member blocks according to a preferred embodiment of the invention, is described herein utilizing the schematic illustrations of FIGS. 3–6.

Figure 3:
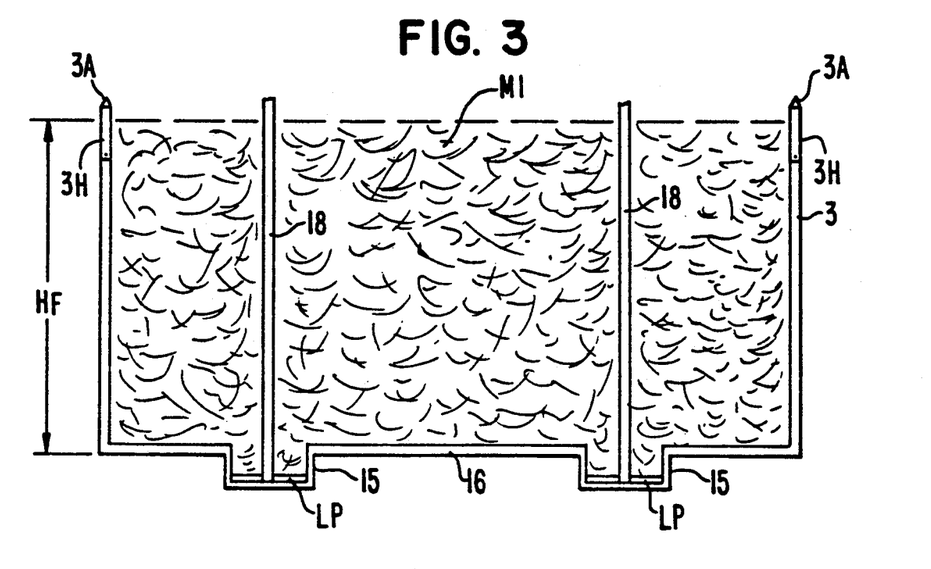
FIG. 3 is a schematic sectional view depicting a first stage of the molding operation of the present invention, wherein the mold form is filled with an uncompressed mixture of uncured tire parts and latex.

FIG. 3 schematically depicts the mold box 3 filled with an uncompressed mixture $M_1$ of the uncured latex and rubber parts. The height $H_1$ is the maximum usable level in the mold box 3, bevel or funnel edge portions 3A being provided at the top to guide the movement of the presser cover plate 7 as it is guided into the upper part of the box 3.

Figure 4:
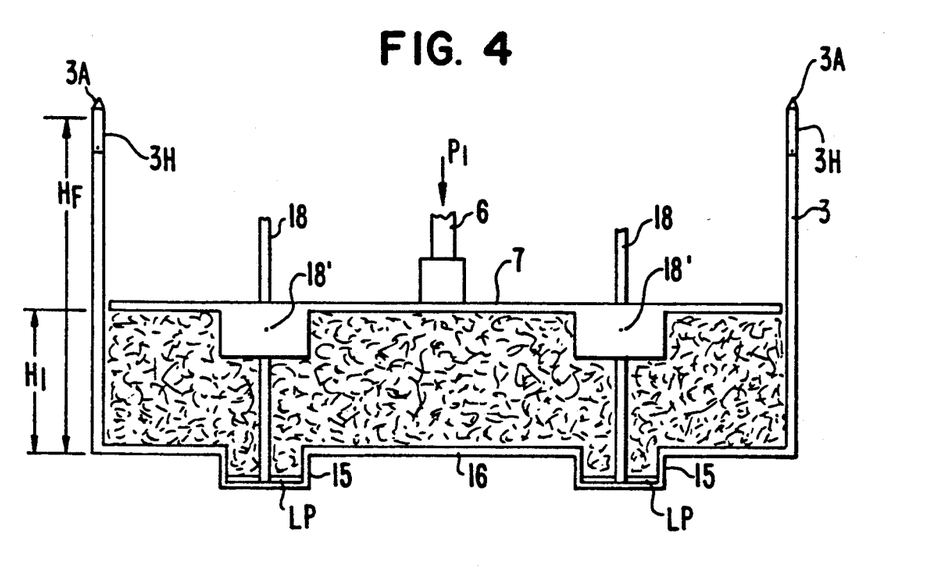
FIG. 4 is a view similar to FIG. 3, but depicting a precompression of the first portion of the uncured mixture in the mold form.
Figure 5:
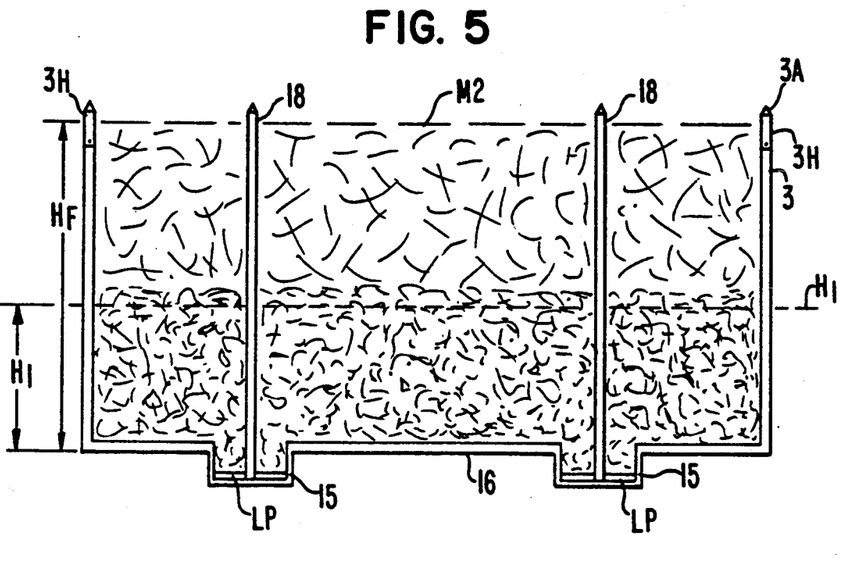
FIG. 5 schematically depicts the addition of further uncompressed uncured mixture on top of the precompressed mixture depicted in FIG. 3.
Figure 6:
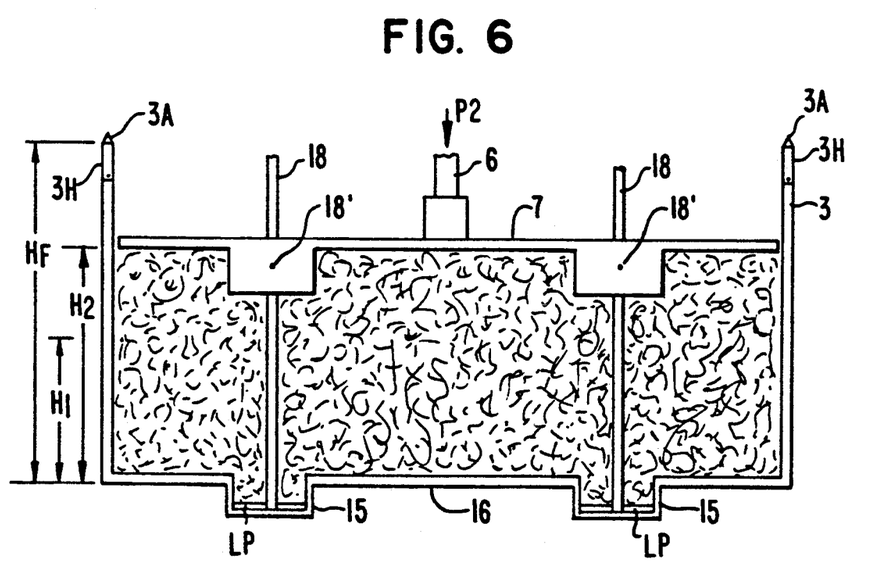
FIG. 6 depicts the second stage final compression of the uncured mixture to a final building member size where it is preliminarily cured under pressure until it is solid enough to be removed from the mold.

FIG. 4 depicts the second stage of the process wherein the presser cover plate 7 is pressed down by hydraulic ram 6 with a pressure $P_1$ to a level where the top level of the now precompressed mixture PM is at a height H1. Next, the presser cover plate 7 is immediately lifted and the mold box 3 is again filled with a mixture $M_2$ of uncured, uncompressed shredded tire parts and latex, again up to the level $H_F$, as illustrated FIG. 5. Next, the presser cover plate 7 is forced down by the hydraulic ram 6 under a pressure $P_2$ to compress the mixture $M_2$ and further compress the precompressed mixture PM at the bottom with the presser plate 7 moving down to a level $H_2$ which corresponds substantially to the desired height of the finished building block member. During this final compression stage, as depicted in FIG. 6, the height $H_1$ of the precompressed material PM of FIG. 5 is further compressed to a height lower than height $H_1$ and the total mixture is compressed together such that a substantially homogenous compressed block is formed extending from the height $H_2$ to the bottom of the mold box 3, with the border line between the first precompressed mixture and the added mixture $M_1$ not substantially affecting the homogenous nature of the complete building block being formed.

The presser plate 7 is held in its maximum pressure position at level H2 for a predetermined pressurized curing time of about 5 to 10 minutes, which assures solidification of the block sufficient to accommodate removal from the mold box 3. Subsequent to this precuring under pressure, the building block member B (see FIGS. 7–9) is removed from the mold box 3 and placed on a curing rack where it is allowed to cure and harden for approximately 24 hours. At this time, a latex sealer is sprayed on the surfaces of the block B to seal the same in its final usable condition.

For lifting the block out of the mold box 3 and preparing the installation for the molding of a subsequent block, the bottoms of the rods 18 have lifting plates LP which are threadably attached to the rods 18 and which extend in the manner of a washer plate at the bottom of the recesses 15 during the molding operations. A locking pin connection 18' is provided between the portions of the protrusions 17 and the rods 18 to accommodate selective locking of the cover member 7 to the plates 18 when in the finished compressed position of FIG. 6. Then the cover 7 is raised by the hydraulic ram, with the rods 18 extending sufficiently high to accommodate guiding movement upward through the table 4 until the block B is lifted above the mold box 3. At this point, the two oppositely facing hinged upper plates 3H are released from their locked vertical position and pivoted and locked into a horizontal position inwardly of the mold box 3. In this position, these hinge plates 3H form a support table for the block B, so that now the cover 7 and rods 18 connected therewith can be pressed downwardly and the lifting plates 15 can be removed, with a consequent lifting up of the rods 18 to free the block B. The block B can then simply be removed from the "table" formed by the hinge plates 3H, the hinge plates 3H can be returned and locked in their vertical position, the lifting plates 15 can be screwed back onto the bottoms of the rods 18, and they can be moved down into the position as shown in FIG. 2, with appropriate unhooking of the pin connections 18 between the protrusions 17 of the cover 7 and the rods 18. Thus in a very simple construction, a sequential manufacturing operation which can be readily repeated is obtained.

Figures 7, 8:
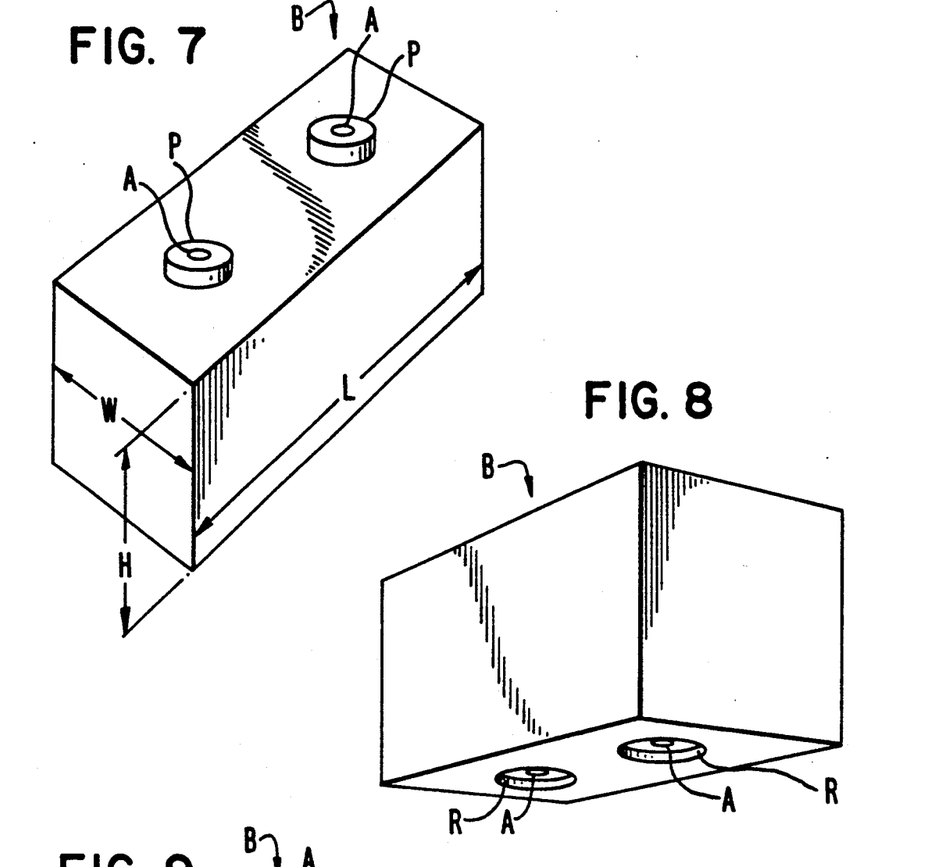
FIG. 7 is a top right perspective view of a building block member made utilizing the form and hydraulic ram pressure plate of FIGS. 1 and 2.
FIG. 8 is a left bottom perspective view of the building block member of FIG. 7.
Figure 9:
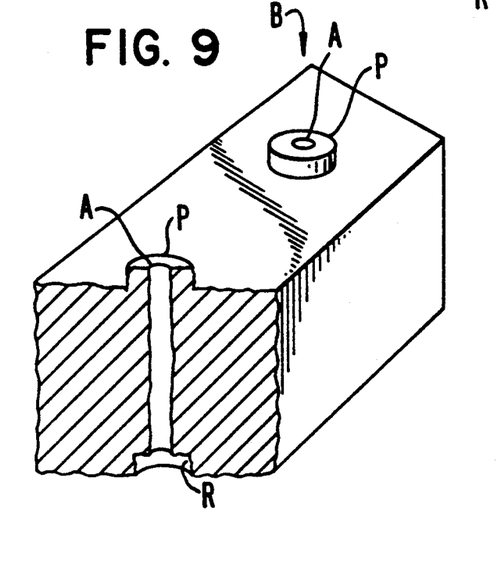
FIG. 9 is a perspective part sectional view of the block member of FIGS. 7 and 8, depicting the configuration of the protrusions and fastening through apertures.

Referring to FIGS. 7-9, the building block B has protrusions P on the top side of the block as depicted in FIG. 7, which protrusions P were formed at the recesses 15 in the mold box 3 (see FIG. 2). Correspondingly, the bottom of the block B includes recesses R which were formed by the protrusions 17 of the presser cover plate 7. Centrally of each of the protrusions P and recesses R there is provided a through aperture A which is formed in the mold box 3 by the rods 18 that are fixed to the bottom of the mold box 3 and are configured to permit sliding movement of the presser cover plate 7 during its up and down movements as the block member B is formed.

In an exemplary preferred small block member embodiment, the block member B being formed has a height H of one foot, a width W of one foot, and a length L of two feet. With this one by one by two block member, the protrusions P are cylindrical and have a three inch diameter and the apertures A are cylindrical and have a one inch diameter. The recesses R have a corresponding slightly larger dimension than the protrusions P so as to permit stacking and attachment of the building blocks to form various configurations as depicted in FIGS. 12 and 13.

Figure 10:
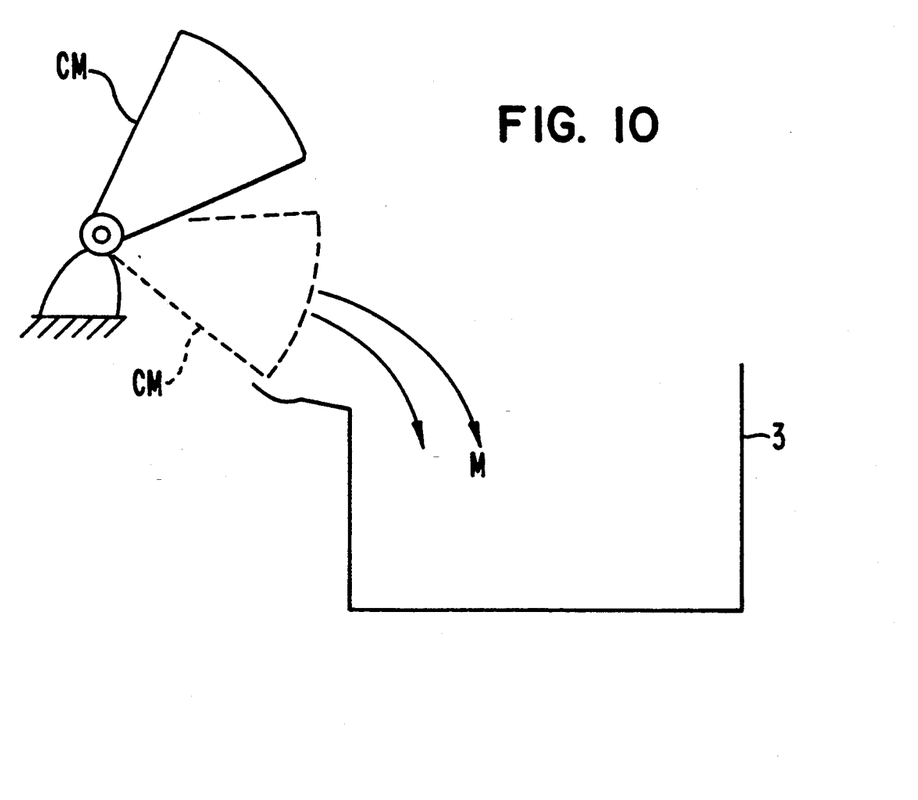
FIG. 10 schematically depicts a first system for mixing and supplying the uncured mixture utilizing a small batch rotary drum cement mixture.

FIG. 10 schematically depicts a first embodiment of an arrangement for mixing the latex and tire parts in a one wheel barrow (or one-third yard) cement mixer CM, which has a mixing barrel which is pivotal to an unloading position to permit pouring of the mixture into the schematically depicted mold box 3. In preferred practical embodiments, a cement mixer of this type utilizes five or six shredded automobile tires, shredded to a size of about one-half by one-half inch pieces or slightly smaller, which results in about 110 pounds total tire parts, with five quarts of liquid latex mixed therewith. This mixture is sufficient to form a one by one by two foot block member B as described above having a weight of approximately 120 pounds (111 pounds rubber tire parts and 9½ pounds of latex). For forming this one by one by two block member so as to have the density indicated, the first pressurizing stage depicted in FIG. 3 utilize application of 1200 to 1400 pounds per square inch pressure on the top of the mixture M by means of the presser plate 7. The final pressurization as depicted in FIG. 6 utilizes 3000 psi applied by the presser plate 7. For forming the one-foot high block with these pressures, the box 3 has a maximum fill height $H_F$ of three and one-half feet, the first compression stage as depicted in FIG. 4 results in a height $H_1$ of four inches to five inches and the final pressurizing height $H_2$ is one foot.

Another standard contemplated size for the building blocks B include blocks two feet high, by two wide by four feet long, with corresponding increases in the size of the mold box and the pressures to be applied to the larger cover presser plate required by such larger blocks, including protrusions P and recesses R having a five-inch diameter and the aperture A having a two-inch diameter.

The mixing time in the cement mixer is up to approximately 7 to 10 minutes, which time is sufficient for a thorough coating of the shredded tire parts with latex material, and short enough to avoid that the unpressurized latex cures and hardens so that it cannot be poured into the mold box and compressed to form the block member B as described above.

Figure 11:
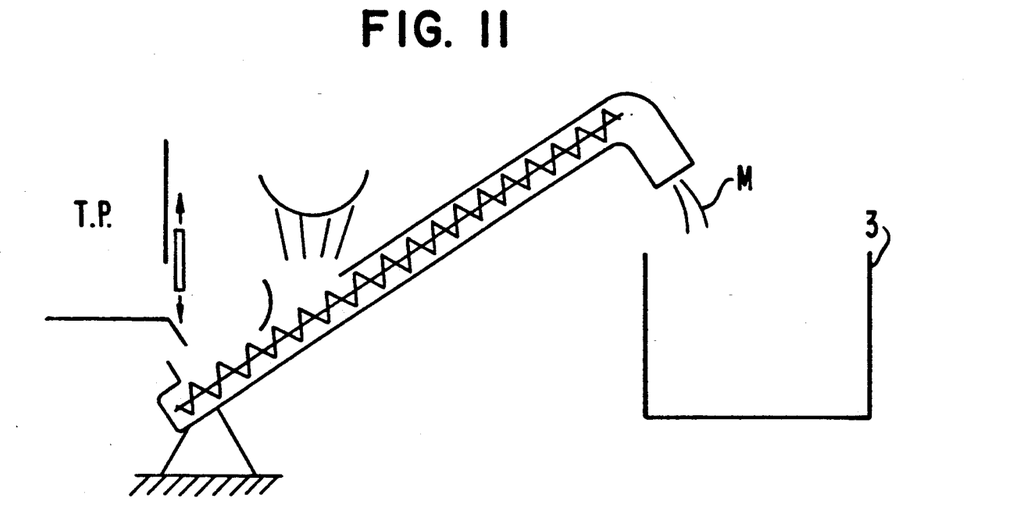
FIG. 11 schematically depicts another system for mixing and supplying the uncured mixture to the mold form, utilizing a rotating helical auger assembly.

FIG. 11 schematically depicts another embodiment of an arrangement for mixing the latex and tire parts using a rotating helical auger assembly. The tire parts TP are fed to the rotating helical auger assembly and the latex is added to the auger. The resulting mix M of the tire parts and latex material is then fed into the mold box 3.

In especially preferred embodiments, the latex used for the mixing with the tire is readily commercially available latex sold as a commodity by, for example, Ennar Corporation. Commodity latex is a natural agricultural product. The sealer is a latex-based sealer which is commercially available from Unda Corporation of South Carolina. About two pints of the sealer is applied to the surface of a one-foot-by-one-foot-by-two-foot finished block B, the sealer being applied after about 24 hours of curing of the completed block. This sealer further assures that there is no leaching of the tire parts, thereby making the block products B usable in underwater and underground installations without environmental damage risks. The sealer can be applied by being painted on with a brush. It is further contemplated that the sealer could be sprayed on, the blocks could be dipped in the sealer, or the sealer could be applied by paint rollers.

Embodiments are also contemplated using multiple mold boxes which are supplied by a common mixing operation, such as an auger, whereby the manufacturing speed is increased as it is not limited by the five-to-ten, and preferably seven minute, compression cure time when in the configuration of FIG. 6, and also the block removal time operations.

The block members formed by the present invention are very advantageous in several important aspects. Since latex is used as the binding agent, and a latex base sealer is used as the sealing agent for the surfaces, the block members have optimum resilience and strength characteristics, as well as longevity in various environments. The latex based sealer mentioned above and used in preferred embodiments meets Army Corps of Engineer specifications for underground and in-water usages, thereby expanding the possibilities for use of the block members of the present invention. Furthermore, the homogenity of the block members, due to the coating of the tire parts in the premixing operation and then the compression and curing together, provides an improved resilient block member configuration as compared to that of my above-mentioned co-pending application. For example, a cutting or tearing of a portion of one of the block members of the present invention would not radically deteriorate its capabilities because of this homogenity.

In preferred practical embodiments of the invention, mechanical limit stops which can be moved into and out of stop positions are provided at the mold box 3 for limiting the movement of the cover member presser plate 7. Such limit stops can be provided for limiting the height $H_1$, as well as the final compression height $H_2$. It is contemplated that the computer control system for the manufacturing operation would include controls for the limit stops, as well as the pressure valves, timing of compression, and the like.

The preferred embodiments described relate to a vertically moving ram and pressure plate system. However, embodiments are also contemplated where the mold box presser plate moves horizontally, it being noted that the uncured uncompressed mixture $M_1$ has sufficient shape control that it can be disposed and leveled at a horizontal face for the short time preceding compression by the presser plate.

The preferred embodiments described utilize two pressurizing steps. This is especially advantageous in view of space considerations for the supply of uncompressed mixture M and the piston stroke of the cylinder piston unit. However, embodiments are also contemplated wherein only a single material supply step and a single compression step are used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Process of making building block members comprising:
   mixing liquid natural latex material with shredded vehicle tire parts to form an uncured mixture with the liquid natural latex substantially coating the tire parts,
   placing a predetermined portion of the uncured mixture into a mold form,
   applying a predetermined pressure to the portion of the uncured mixture in the mold form to compress the same to a predetermined level within the mold form,
   maintaining the predetermined pressure and level of the portion of the uncured mixture for a predetermined time period during which the latex cures and hardens to form a building block member from the mixture.

2. A process according to claim 1, wherein said mixing of liquid latex material with shredded vehicle tire parts is accomplished by placing a predetermined amount of liquid latex material and a predetermined amount of shredded vehicle tire parts in a rotating barrel drum cement mixer, and rotating the cement mixer barrel drum for a predetermined period of time.

3. A process according to claim 1, wherein said mixing of liquid latex material with shredded vehicle tire parts is accomplished by supplying the liquid latex material as a spray onto a rotating auger type conveyor for shredded vehicle tire parts, with the rotating auger serving to both mix the liquid latex material and shredded vehicle tire parts and convey this uncured mixture to a position where it is supplied to the mold form.

4. A process according to claim I, wherein said mold form is a polygonal box type form having a fixed bottom and side walls extending perpendicularly to the bottom and fixed thereto defining an opening at the top opposite the bottom, and wherein said applying of the first and second predetermined pressures is by way of a movable press plate which serves as the top of the mold box and which is movable toward the bottom within the confines of the side walls during pressure applying operations.

5. A process according to claim 1, wherein a hydraulic ram is attached to the press plate for applying the pressure applying forces thereto.

6. Process of making building block members comprising:
   mixing liquid latex material with shredded vehicle tire parts to form an uncured mixture with the liquid latex substantially coating the tire parts,
   placing a predetermined first portion of the uncured mixture into a mold form,
   applying a first predetermined pressure to the first portion of the uncured mixture in the mold form to precompress the same to a first level within the mold form,
   placing a second portion of the uncured mixture into the mold form adjacent the first portion, and
   applying a second predetermined pressure, higher than said first predetermined pressure, to the uncured mixture in the mold form to compress the same to a final predetermined building block member side.

7. A process according to claim 6, wherein said second predetermined pressure is at least twice as great as the first predetermined pressure.

8. A process according to claim 6, wherein said first predetermined pressure is greater than 500 pounds per square inch.

9. A process according to claim 6, wherein said second predetermined pressure is greater than 2500 pounds per square inch.

10. A process according to claim 6, wherein said first predetermined pressure is between 300 and 1500 pounds per square inch, and wherein said second predetermined pressure is greater than 2500 pounds per square inch.

11. A process according to claim 6, wherein said mixing of liquid latex material with shredded vehicle tire parts is accomplished by placing a predetermined amount of liquid latex material and a predetermined amount of shredded vehicle tire parts in a rotating barrel drum cement mixer, and rotating the cement mixer barrel drum for a predetermined period of time.

12. A process according to claim 6, wherein said mixing of liquid latex material with shredded vehicle tire parts is accomplished by supplying the liquid latex material as a spray onto an rotating auger type conveyor for shredded vehicle tire parts, with the rotating auger serving to both mix the liquid latex material and shredded vehicle tire parts and convey this uncured mixture to a position where it is supplied to the mold form.

13. A process according to claim 6, wherein said mold form is a rectangular box type form having a fixed bottom and four sides extending perpendicularly to the bottom and fixed thereto defining an opening at the side opposite the bottom, and wherein said applying of the first and second predetermined pressures is by way of a movable press plate which serves as the top side of the mold box and which is movable toward the bottom side during pressure applying operations.

14. A process according to claim 3, wherein a hydraulic ram is attached to the press plate for applying the pressure applying forces thereto.

15. A process according to claim 14, further comprising calibrating the pressurizing system for the hydraulic ram by the following sequential steps:
   measuring the level of the first portion of the uncured mixture in the mold box prior to precompression thereof,
   applying the first predetermined pressure to the first portion of the uncured mixture and measuring the level of the precompressed uncured mixture in the mold box,
   measuring the pressure required to move the ram to a level in the mold corresponding to the desired block size of the final compressed mixture,
   and storing this required pressure for use in performing repeat operations to form subsequent block members.

16. Process of making building block members comprising:
   mixing liquid latex material with shredded vehicle tire parts to form an uncured mixture with the liquid latex substantially coating the tire parts,
   placing a predetermined portion of the uncured mixture into a mold form,
   applying a predetermined pressure to the portion of the uncured mixture in the mold form to compress the same to a predetermined level within the mold form,
   maintaining the predetermined pressure and level of the portion of the uncured mixture for a predetermined time period during which the latex cures and hardens to form a building block member from the mixture,
   wherein said mixing of liquid latex material with shredded vehicle tire parts is accomplished by placing a predetermined amount of liquid latex material and a predetermined amount of shredded vehicle tire parts in a rotating barrel drum cement mixer, and rotating the cement mixer barrel drum for a predetermined period of time.

17. Process of making building block members comprising:
   mixing liquid latex material with shredded vehicle tire parts to form an uncured mixture with the liquid latex substantially coating the tire parts,
   placing a predetermined portion of the uncured mixture into a mold form,
   applying a predetermined pressure to the portion of the uncured mixture in the mold form to compress the same to a predetermined level within the mold form,
   maintaining the predetermined pressure and level of the portion of the uncured mixture for a predetermined time period during which the latex cures and hardens to form a building block member from the mixture,
   wherein said mixing of liquid latex material with shredded vehicle tire parts is accomplished by supplying the liquid latex material as a spray onto a rotating auger type conveyor for shredded vehicle tire parts, with the rotating auger serving to both mix the liquid latex material and shredded vehicle tire parts and convey this uncured mixture to a position where it is supplied to the mold form,
   wherein a hydraulic ram is attached to the press plate for applying the pressure applying forces thereto,
   further comprising calibrating the pressurizing system for the hydraulic ram by the following sequential steps:
   measuring the level of the first portion of the uncured mixture in the mold box prior to recompression thereof,
   applying the first predetermined pressure to the first portion of the uncured mixture and measuring the level of the precompressed uncured mixture in the mold box,
   measuring the pressure required to move the ram to a level in the mold corresponding to the desired block size of the final compressed mixture,
   and storing this required pressure for use in performing repeat operations to form subsequent block members.

* * * * *